United States Patent [19]

Hirai et al.

[11] Patent Number: 5,185,304
[45] Date of Patent: Feb. 9, 1993

[54] DIELECTRIC CERAMIC COMPOSITION OF BAO, TIO₂, ND₂O₃, SM₂O₃ AND BI₂O₃

[75] Inventors: Takami Hirai, Aichi; Shinsuke Yano; Masahiro Abe, both of Nagoya, all of Japan

[73] Assignee: NGK Insulators, Ltd., Japan

[21] Appl. No.: 745,180

[22] Filed: Aug. 15, 1991

[30] Foreign Application Priority Data

Aug. 20, 1990 [JP] Japan .................. 2-219716
Mar. 22, 1991 [JP] Japan .................. 3-83570

[51] Int. Cl.⁵ .............................................. C04B 35/46
[52] U.S. Cl. ................................................ 501/139
[58] Field of Search ..................................... 501/139

[56] References Cited

U.S. PATENT DOCUMENTS 5,013,695  5/1991  Kato et al. .................. 501/139

FOREIGN PATENT DOCUMENTS

| | | |
|---|---|---|
| 0412440 | 2/1991 | European Pat. Off. . |
| 56-102003 | 8/1981 | Japan . |
| 57-21010 | 2/1982 | Japan . |
| 0156367 | 9/1982 | Japan .................. 501/139 |
| 58-20905 | 4/1983 | Japan . |
| 59-23048 | 5/1984 | Japan . |
| 61-41863 | 9/1986 | Japan . |
| 62-10096 | 1/1987 | Japan . |
| 63-117958 | 5/1988 | Japan . |
| 1-227303 | 9/1989 | Japan . |
| 1-227304 | 9/1989 | Japan . |

OTHER PUBLICATIONS

World Patents Index, Week 8049, Derwent Publications Ltd., London, GB; AN 80-85052C & JP-A-55 131 901 (KCK KK) Oct. 15, 1980-abstract.
Chemical Abstracts, vol. 107, Columbus, Ohio, US; abstract No. 69267N, p. 689; abstract & JP-A-6 205 509 (Taiyo Yuden Co., Ltd.) Jan. 12, 1987.

*Primary Examiner*—Mark L. Bell
*Assistant Examiner*—Deborah Jones
*Attorney, Agent, or Firm*—Parkhurst, Wendel & Rossi

[57] ABSTRACT

A dielectric ceramic composition is disclosed which consists principally of barium oxide, titanium oxide, neodymium oxide, samarium oxide and bismuth oxide, which are represented by the following formula $xBaO-yTiO_2-z[(1-a-b)Nd_2O_3-aSm_2O_3-bBi_2O_3]$, where $0.10 \leq x \leq 0.20$, $0.60 \leq y \leq 0.75$, $0.10 \leq z \leq 0.24$, $x+y+z=1$, $0<a \leq 0.25$ and $0<b \leq 0.30$. Also disclosed is a dielectric ceramic composition which consists principally of: barium oxide, titanium oxide, neodymium oxide, samarium oxide and bismuth oxide as major components which are represented by the following formula $xBaO-yTiO_2-z[1-a-b)Nd_2O_3-aSm_2O_3-bBi_2O_3]$, where $0.10 \leq x \leq 0.20$, $0.60 \leq y \leq 0.75$, $0.10 \leq z \leq 0.25$, $x+y+z=1$, $0<a \leq 0.30$ and $0<b \leq 0.35$; and not more than 2.0 parts by weight of alumina per 100 parts by weight of a total of the major components.

13 Claims, No Drawings

DIELECTRIC CERAMIC COMPOSITION OF BAO, TIO$_2$, ND$_2$O$_3$, SM$_2$O$_3$ AND BI$_2$O$_3$

BACKGROUND OF THE INVENTION

1. Field of the Invention

The present invention relates in general to a dielectric ceramic composition, particularly to a dielectric ceramic composition suitable for forming dielectric resonators, for example, which are used with microwave (high-frequency) devices.

2. Discussion of the Prior Art

Keeping pace with recent developments of various microwave devices such as pocket or portable telephones, there has been a growing demand for small-sized high-performance dielectric resonators used in such devices. In particular, a dielectric ceramic used to form such dielectric resonators is required to have the following physical and structural features;

(1) The dielectric ceramic should have a sufficiently high specific dielectric constant ($\tau r$), to reduce the size of a resonator when the resonator is operated at a given frequency.

(2) The dielectric ceramic should have a sufficiently high Q value, to reduce the transmission loss of the resonator formed of the dielectric ceramic.

(3) The temperature coefficient ($\tau f$) of the resonance frequency of the resonator formed of the dielectric ceramic should be sufficiently low, to minimize changes of the operating characteristics of the resonator with respect to temperature.

There have been known various dielectric ceramic compositions used for forming such dielectric resonators. For example, laid-open Publication No. 58-20905 of examined Japanese Patent Application discloses a dielectric ceramic composition whose major components consist of BaO and TiO$_2$, a portion of which may be substituted by another element or other elements. A dielectric ceramic formed of the disclosed composition has a relatively low dielectric constant of around 30~40, and a relatively low Q value. Another example of dielectric ceramic composition is disclosed in laid-open Publication No. 59-23048 of examined Japanese Patent Application, which has a composite perovskite structure such as Ba(Mg$_{\frac{1}{3}}$Ta$_{\frac{2}{3}}$)O$_3$. The dielectric ceramic formed of this composition has a relatively high Q value, but suffers from a relatively low dielectric constant of around 30~40.

There is also known a dielectric ceramic composition as disclosed in laid-open Publication 56-102003 of unexamined Japanese Patent Application, whose major components consist of BaO, TiO$_2$, Nd$_2$O$_3$ and Bi$_2$O$_3$. While this dielectric ceramic composition has a relatively high dielectric constant, the temperature coefficient of the resonance frequency of the resonator formed of this ceramic composition is undesirably high, making it difficult for the resonator to provide satisfactory operating characteristics. A further example of dielectric ceramic composition as disclosed in laid-open Publication No. 57-21010 of unexamined Japanese Patent Application, whose major components consist of BaO, TiO$_2$, Nd$_2$O$_3$ and SmO$_3$, cannot achieve a sufficiently low temperature coefficient of the resonance frequency and a sufficiently high dielectric constant at the same time. Still another example of dielectric ceramic composition is disclosed in laid-open Publication No. 62-100906 of unexamined Japanese Patent Application, which contains BaO, TiO$_2$, Nd$_2$O$_3$, Sm$_2$O$_3$ and Bi$_2$O$_3$ as major components. The dielectric constant of this ceramic composition is not so high as to allow the resonator using the composition to be sufficiently small-sized. Further, this composition is economically disadvantageous since it contains as much as 7-20 mole % of samarium oxide which is a relatively expensive material.

To improve the above-described properties of the dielectric ceramics, there have been proposed to add alumina (Al$_2$O$_3$) to the known dielectric ceramic composition. For example, Publication No. 61-41863 of examined Japanese Patent Application discloses a dielectric ceramic composition which contains BaO, TiO$_2$, Sm$_2$O$_3$ and Al$_2$O$_3$ as major components. The added alumina is effective to raise the dielectric constant and Q value of the dielectric ceramics obtained. However, the addition of alumina to this composition also results in an increase in the temperature coefficient. Another example of dielectric ceramic composition is disclosed in laid-open Publication No. 1-227303 of unexamined Japanese Patent Application, which contains BaO, TiO$_2$, Nd$_2$O$_3$ and Al$_2$O$_3$ as major components. The dielectric ceramic formed of this composition has a relatively low Q value due to the addition of alumina, resulting in an increased transmission loss of the resonator obtained from the dielectric ceramic.

A further example of dielectric ceramic composition as disclosed in laid-open Publication No. 63-117958 of unexamined Japanese Patent Application, whose major components consist of BaO, TiO$_2$, Nd$_2$O$_3$, Bi$_2$O$_3$ and Al$_2$O$_3$, has a relatively high dielectric constant. The temperature coefficient of this ceramic composition is stabilized by the addition of alumina, but still remains relatively high. Still another example of dielectric ceramic composition as disclosed in laid-open Publication No. 1-227304 of unexamined Japanese Patent Application, whose major components consist of BaO, TiO$_2$, Nd$_2$O$_3$, Bi$_4$Ti$_3$O$_{12}$ and Al$_2$O$_3$, also has a relatively high dielectric constant. However, the dielectric ceramic formed of this composition has a relatively low Q value due to the addition of alumina, resulting in an increased transmission loss of the resonator obtained from the dielectric ceramic.

SUMMARY OF THE INVENTION

The present invention was developed in light of the prior art situations described above. It is accordingly an object of the present invention to provide a dielectric ceramic composition at a reduced cost, which has a sufficiently high dielectric constant and a sufficiently high Q value, and whose resonance frequency has a sufficiently low temperature coefficient.

The above object may be attained according to the principle of the present invention, which provides a dielectric ceramic composition which consists principally of barium oxide, titanium oxide, neodymium oxide and samarium oxide, which are represented by the following formula: xBaO —yTiO$_2$—z[(1—a—b)Nd$_2$O$_3$—aSm$_2$O$_3$—bBi$_2$O$_3$], where $0.10 \leq x \leq 0.20$, $0.60 \leq y \leq 0.75$, $0.10 \leq z \leq 0.24$, $x+y+z=1$, $0 < a \leq 0.25$ and $0 < b \leq 0.30$.

The dielectric ceramic composition according to one aspect of the present invention consists principally of barium oxide (BaO), titanium oxide (TiO$_2$), neodymium oxide (Nd$_2$O$_3$), samarium oxide (Sm$_2$O$_3$) and bismuth oxide (Bi$_2$O$_3$), in respective specific amounts as indicated by the above formula. A dielectric ceramic body formed of the present composition exhibits excellent microwave dielectric properties as described below. Further, the present dielectric ceramic composition is available at a relatively low cost since the amount of samarium oxide ($Sm_2O_3$) used is significantly reduced as compared with that of the conventional dielectric ceramic.

If the BaO content of the dielectric ceramic composition is smaller than 10 mole % ($x < 0.10$), the dielectric constant of the obtained dielectric ceramic is undesirably lowered. If the BaO content exceeds 20 mole % ($x > 0.20$), the dielectric ceramic suffers from an excessively high temperature coefficient of the resonance frequency. If the $TiO$, content of the dielectric ceramic composition is smaller than 60 mole % ($y > 0.60$), the Q value of the dielectric ceramic obtained is considerably deteriorated. If the $TiO_2$ content exceeds 75 mole % ($y > 0.75$), the temperature coefficient of the resonance frequency of the dielectric ceramic becomes excessively high.

If the total content of $Nd_2O_3$, $Sm_2O_3$ and $Bi_2O_3$, i.e., the above-indicated term $[(1-a-b)Nd_2O_3-aSm_2O_3-bBi_2O_3]$ is smaller than 10 mole % ($z < 0.10$), the resonance frequency of the dielectric ceramic has a comparatively high temperature coefficient. If the total content of $Nd_2O_3$, $Sm_2O_3$ and $Bi_2O_3$ exceeds 24 mole % ($z\ 0.24$), the sinterability of the dielectric ceramic is unfavorably deteriorated.

According to the present invention, $Sm_2O_3$ and $Bi_2O_3$ are used with $Nd_2O_3$ so as to substitute for a portion of $Nd_2O_3$. The substitution of $Sm_2O_3$ for $Nd_2O_3$ is effective to increase the Q value of the dielectric ceramic and lower the temperature coefficient of the same. In particular, it is desirable to substitute at least 3 mole % ($a \geq 0.03$) of $Sm_2O_3$ for a portion of $Nd_2O_3$ so that the use of the samarium oxide gives satisfactory effects as described above. However, if the amount of substitution of $Sm_2O_3$ for $Nd_2O_3$ exceeds 25 mole % ($a > 0.25$), the dielectric constant of the dielectric ceramic is lowered. Further, since the cost of samarium oxide is comparatively high, the substituting amount of $Sm_2O_3$ should be practically kept within 25 mole %, from an economical point of view.

The substitution of $Bi_2O_3$ for $Nd_2O_3$ is effective to raise the dielectric constant of the dielectric ceramic and lower the temperature coefficient of the resonance frequency of the same. In particular, it is desirable to substitute at least 5 mole % ($b \geq 0.05$) of $Bi_2O_3$ for a portion of $Nd_2O_3$ so that the use of the bismuth oxide gives satisfactory effects as described above. However, if the amount of substitution of $Bi_2O_3$ for $Nd_2O_3$ exceeds 30 mole % ($b > 0.30$), the dielectric ceramic is not suitable for practical use because of an excessively lowered Q value.

A further study revealed that it is desirable to add a small amount of alumina to the above-described major components BaO, $TiO_2$, $Nd_2O_3$, $Sm_2O_3$ and $Bi_2O_3$, so as to effectively lower the temperature coefficient of the resonance frequency and further raise the Q value, without affecting the relatively high dielectric constant.

Thus, the above-described object may also be attained according to another aspect of the present invention, which provides a dielectric ceramic composition which consists principally of: barium,oxide, titanium oxide, neodymium oxide, samarium oxide and bismuth oxide as major components which are represented by the following formula $xBaO-yTiO_2-z[(1-a-b)Nd_2O_3-aSm_2O_3-bBi_2O_3]$, where $0.10 \leq x \leq 0.20$, $0.60 \leq y 0.75$, $0.10 \leq z \leq 0.25, x+y+z = 1, 0 < a \leq 0.30$ and $0 < b \leq 0.35$; and not more than 2.0 parts by weight of alumina per 100 parts by weight of a total amount of the major components.

The dielectric ceramic composition according to the present invention consists principally of barium oxide (BaO), titanium oxide ($TiO_2$), neodymium oxide ($Nd_2O_3$), samarium oxide ($Sm_2O_3$) and bismuth oxide ($Bi_2O_3$) as major components, in the respective specific amounts as indicated by the above formula. A dielectric ceramic body formed of the present composition exhibits excellent microwave dielectric properties, and is available at a relatively low cost. Further, since the present dielectric ceramic composition further comprises alumina ($Al_2O_3$) in a given amount, the dielectric ceramic formed of this composition is given a significantly increased Q value and an effectively lowered temperature coefficient, while maintaining a relatively high dielectric constant.

The lower and upper limits of the BaO and $TiO_2$ contents are determined as indicated above, for the same reasons as described with respect to the first aspect of the present invention.

If the total content of $Nd_2O_3$, $Sm_2O_3$ and $Bi_2O_3$, i e., the above-indicated term $[(1-a-b)Nd_2O_3-aSm_2O_3-bBi_2O_3]$ is smaller than 10 mole % ($z < 0.10$), the resonance frequency of the dielectric ceramic has a comparatively high temperature coefficient. If the total content of $Nd_2O_3$, $Sm_2O_3$ and $Bi_2O_3$ exceeds 25 mole % ($z > 0.25$), the sinterability of the dielectric ceramic is deteriorated.

According to the present invention, $Sm_2O_3$ and $Bi_2O_3$ are used with $Nd_2O_3$ so as to substitute for a portion of $Nd_2O_3$. The substitution of $Sm_2O_3$ for $Nd_2O_3$ is effective to increase the Q value of the dielectric ceramic and lower the temperature coefficient of the same. In particular, it is desirable to substitute at least 3 mole % ($a \geq 0.03$) of $Sm_2O_3$ for a portion of $Nd_2O_3$ so that the use of samarium oxide gives satisfactory effects as described above. However, since the cost of samarium oxide is comparatively high, the amount of substitution of $Sm_2O_3$ for $Nd_2O_3$ should be practically kept within 30 mole % ($a \leq 0.30$) from an economical point of view.

The substitution of $Bi_2O_3$ for $Nd_2O_3$ is effective to raise the dielectric constant of the dielectric ceramic and lower the temperature coefficient of the resonance frequency of the same. In particular, it is desirable to substitute at least 5 mole % ($b \geq 0.05$) of $Bi_2O_3$ for a portion of $Nd_2O_3$ so that the use of bismuth oxide gives satisfactory effects as described above. However, if the amount of substitution of $Bi_2O_3$ for $Nd_2O_3$ reaches 15-20 mole % or more, the temperature coefficient becomes higher. Further, the Q value of the dielectric ceramic is lowered as the amount of the $Bi_2O_3$ increases. Accordingly, the amount of the $Bi_2O_3$ as the substituent should be kept within 35 mole % ($b \leq 0.35$) for practical use.

According to the above second aspect of the present invention, the composition further contains not more than 2.0 parts by weight of alumina ($Al_2O_3$) per 100 parts by weight of the total amount of the major components. The addition of alumina is effective to raise the Q value and effectively lower the temperature coefficient while maintaining the relatively high dielectric constant. While the Q value increases as the amount of the added alumina increases, the increase in the Q value is stopped when the alumina amount exceeds 2.0 parts by weight, and then the Q value begins to be lowered. On the other hand, the temperature coefficient of the dielectric ceramic is lowered with the increase in the amount of alumina added. However, the properties of the dielectric ceramic are deteriorated if the temperature coefficient is excessively lowered to a considerably large negative value. In view of these situations, it is preferable that the specific amount of alumina added to the composition be kept in a range of about 0.1–1.8 parts by weight per 100 parts by weight of the major components.

EXAMPLES

To further clarify the concept of the present invention, some examples of the invention will be described. It is to be understood that the invention is not limited to the details of the illustrated examples, but may be embodied with various alterations, modifications and improvements, which may occur to those skilled in the art, without departing from the scope of the invention defined in the appended claims.

EXAMPLE 1

Initially, the amounts of highly pure barium oxide, titanium oxide, neodymium oxide, samarium oxide and bismuth oxide were measured so as to give various mole proportions (x, y, z, a and b) as indicated in TABLES 1-A, 1-B, 2-A and 2-B below. The measured materials having each mole proportion were then wet-mixed with some pure water in a polyethylene pot mill using alumina balls. The thus obtained mixture was taken out of the pot mill, dried, and calcined in the air for two hours at 1000° C. Then, the calcined mixture was thrown back into the polyethylene pot mill using alumina balls, and wet-ground with some pure water added to the calcined mixture. At this stage, 1% by weight of polyvinyl alcohol (PVA) was added as a binder, which was uniformly mixed with the calcined mixture in the form of a powder. The thus obtained mixture was then dried and passed through a 400 mesh sieve, whereby dielectric ceramic mixture powders Nos. 1–40 as indicated in TABLE 1-A, 1-B, 2-A and 2-B were prepared.

The thus prepared dielectric ceramic mixture powders were subjected to a press-forming operation under surface pressure of 1 ton/cm$^2$, to prepare respective samples of circular discs, each of which has a diameter of 20 mm and a thickness of 15 mm. The samples were fired in the air for two hours at a temperature of 1300°–1400° C. The fired samples were ground to a final size of 14 mm diameter and 7 mm thickness.

The thus prepared samples (Nos. 1–48) of dielectric ceramic body in the form of discs were tested to measure the dielectric constant and the non-load Q value, according to Hakki & Coleman method. Also, the temperature coefficients ($\tau f$) of the resonance frequency of the samples over a range of −25° C. to 75° C. were measured. The measured values are indicated in TABLE 1-A, 1-B, 2-A and 2-B. The measurements were made over the frequency range of 3–4GHz. The Q values indicated in the tables are converted equivalents at 3GHz.

It will be understood from TABLES 1-A, 1-B, 2-A and 2-B that the dielectric ceramic bodies made of the compositions Nos. 1–23 and 28–42 according to the present invention had sufficiently high dielectric constants and Q values, and significantly lowered temperature coefficients ($\tau f$) of the resonance frequency. On the other hand, the comparative samples made of the compositions Nos. 24–27 and 43–48 were unsatisfactory in terms of at least one of the dielectric constant, Q value and temperature coefficient ($\tau f$).

It will be understood from the above description that the dielectric ceramic made of the dielectric ceramic composition according to the present invention has a sufficiently high dielectric constant, a sufficiently high Q value and a sufficiently low temperature coefficient of the resonance frequency. The present dielectric ceramic composition can be prepared at a relatively low cost because of the reduced amount of the samarium oxide used.

TABLE 1-A

| No. | x | y | z | a | b | Dielectric Constant | Q | $\tau f$ (ppm/°C.) |
|---|---|---|---|---|---|---|---|---|
| PRESENT INVENTION | | | | | | | | |
| 1 | 0.135 | 0.680 | 0.185 | 0.100 | 0.050 | 82 | 2340 | 6 |
| 2 | 0.135 | 0.680 | 0.185 | 0.100 | 0.100 | 86 | 1980 | 0 |
| 3 | 0.135 | 0.680 | 0.185 | 0.100 | 0.150 | 90 | 1210 | 0 |
| 4 | 0.140 | 0.680 | 0.180 | 0.100 | 0.100 | 87 | 2220 | 12 |
| 5 | 0.140 | 0.680 | 0.180 | 0.100 | 0.150 | 92 | 1820 | 3 |
| 6 | 0.145 | 0.675 | 0.180 | 0.100 | 0.050 | 83 | 2860 | 10 |
| 7 | 0.145 | 0.675 | 0.180 | 0.100 | 0.100 | 87 | 2340 | 1 |
| 8 | 0.145 | 0.675 | 0.180 | 0.100 | 0.120 | 90 | 2010 | 2 |
| 9 | 0.145 | 0.675 | 0.180 | 0.100 | 0.140 | 92 | 1820 | 4 |
| 10 | 0.145 | 0.675 | 0.180 | 0.100 | 0.150 | 92 | 1820 | 3 |
| 11 | 0.145 | 0.675 | 0.180 | 0.100 | 0.160 | 94 | 1650 | 3 |
| 12 | 0.140 | 0.675 | 0.185 | 0.100 | 0.050 | 81 | 2610 | 5 |
| 13 | 0.140 | 0.675 | 0.185 | 0.100 | 0.100 | 84 | 2130 | −6 |
| 14 | 0.140 | 0.675 | 0.185 | 0.100 | 0.150 | 89 | 1570 | −4 |
| 15 | 0.145 | 0.680 | 0.175 | 0.200 | 0.150 | 94 | 1820 | 8 |

TABLE 1-B

| No. | x | y | z | a | b | Dielectric Constant | Q | $\tau f$ (ppm/°C.) |
|---|---|---|---|---|---|---|---|---|
| PRESENT INVENTION | | | | | | | | |
| 16 | 0.145 | 0.680 | 0.175 | 0.200 | 0.200 | 100 | 1370 | 12 |
| 17 | 0.145 | 0.680 | 0.175 | 0.200 | 0.250 | 105 | 1000 | 21 |
| 18 | 0.145 | 0.680 | 0.175 | 0.100 | 0.050 | 86 | 2710 | 22 |
| 19 | 0.145 | 0.680 | 0.175 | 0.100 | 0.100 | 90 | 2190 | 13 |
| 20 | 0.145 | 0.680 | 0.175 | 0.100 | 0.150 | 94 | 1820 | 11 |
| 21 | 0.145 | 0.680 | 0.175 | 0.100 | 0.175 | 97 | 1610 | 14 |
| 22 | 0.145 | 0.580 | 0.175 | 0.100 | 0.200 | 100 | 1400 | 17 |
| 23 | 0.145 | 0.680 | 0.175 | 0.100 | 0.250 | 106 | 1010 | 34 |
| COMPARATIVE | | | | | | | | |
| 24 | 0.145 | 0.680 | 0.175 | 0.100 | 0.000 | 82 | 3280 | 51 |
| 25 | 0.145 | 0.680 | 0.175 | 0.000 | 0.250 | 108 | 760 | 48 |
| 26 | 0.145 | 0.580 | 0.175 | 0.300 | 0.300 | 92 | 870 | 32 |
| 27 | 0.145 | 0.680 | 0.175 | 0.100 | 0.330 | 110 | 420 | 55 |

TABLE 2-A

| No. | x | y | z | a | b | Dielectric Constant | Q | $\tau f$ (ppm/°C.) |
|---|---|---|---|---|---|---|---|---|
| PRESENT INVENTION | | | | | | | | |
| 28 | 0.150 | 0.675 | 0.175 | 0.200 | 0.150 | 94 | 1770 | 2 |
| 29 | 0.150 | 0.675 | 0.175 | 0.200 | 0.200 | 99 | 1390 | 4 |
| 30 | 0.150 | 0.675 | 0.175 | 0.200 | 0.250 | 105 | 1050 | 12 |
| 31 | 0.150 | 0.750 | 0.100 | 0.200 | 0.100 | 73 | 2900 | 22 |
| 32 | 0.150 | 0.750 | 0.100 | 0.200 | 0.200 | 81 | 2320 | 17 |
| 33 | 0.100 | 0.750 | 0.150 | 0.250 | 0.250 | 83 | 2720 | 48 |
| 34 | 0.170 | 0.700 | 0.130 | 0.150 | 0.200 | 82 | 3200 | 31 |
| 35 | 0.170 | 0.700 | 0.130 | 0.150 | 0.250 | 86 | 2760 | 28 |
| 36 | 0.150 | 0.710 | 0.140 | 0.100 | 0.200 | 84 | 2920 | 29 |
| 37 | 0.150 | 0.710 | 0.140 | 0.200 | 0.200 | 84 | 3010 | 24 |
| 38 | 0.200 | 0.700 | 0.100 | 0.200 | 0.100 | 72 | 2200 | 32 |
| 39 | 0.125 | 0.750 | 0.125 | 0.200 | 0.200 | 74 | 3510 | 34 |
| 40 | 0.115 | 0.670 | 0.215 | 0.100 | 0.050 | 69 | 1210 | 7 |
| 41 | 0.115 | 0.670 | 0.215 | 0.200 | 0.050 | 69 | 1450 | 5 |
| 42 | 0.125 | 0.695 | 0.180 | 0.100 | 0.100 | 79 | 3220 | 21 |

TABLE 2-B

| No. | x | y | z | a | b | Dielectric Constant | Q | τf (ppm/°C.) |
|---|---|---|---|---|---|---|---|---|
| COMPARATIVE EXAMPLES | | | | | | | | |
| 43 | 0.220 | 0.650 | 0.130 | 0.200 | 0.200 | 92 | 1200 | 58 |
| 44 | 0.125 | 0.775 | 0.100 | 0.200 | 0.200 | 89 | 3200 | 125 |
| 45 | 0.175 | 0.740 | 0.085 | 0.200 | 0.200 | 71 | 1900 | 62 |
| 46 | 0.075 | 0.700 | 0.225 | 0.200 | 0.200 | 62 | 450 | 74 |
| 47 | 0.120 | 0.620 | 0.260 | 0.200 | 0.200 | 72 | 760 | — |
| 48 | 0.190 | 0.590 | 0.220 | 0.200 | 0.200 | 59 | 380 | — |

EXAMPLE 2

Initially, the amounts of highly pure barium oxide, titanium oxide, neodymium oxide, samarium oxide, bismuth oxide and alumina were measured so as to give various mole proportions (x, y, z, a and b) as indicated in TABLE 3 below. The measured materials having each mole proportion were then wet-mixed with some pure water in a polyethylene pot mill using alumina balls. The thus obtained mixture was taken out of the pot mill, dried and put into an alumina crucible where the mixture was calcined in air for four hours at 1000° C. Then, the calcined mixture was thrown back into the polyethylene pot mill using alumina balls, and wet-ground with some pure water added to the calcined mixture. At this stage, 1% by weight of polyvinyl alcohol (PVA) was added as a binder, which was uniformly mixed with the calcined mixture in the form of a powder. The thus obtained mixture was then dried and passed through a 400 mesh sieve, whereby dielectric ceramic mixture powders Nos. 1–16 as indicated in TABLE 3 were prepared.

The thus prepared dielectric ceramic mixture powders were subjected to a press-forming operation under surface pressure of 1 ton/cm², to prepare respective samples of circular discs, each of which has a diameter of 20 mm and a thickness of 15 mm. The samples were fired in the air for two hours at a temperature of 1300°–1400° C. The fired samples were ground to a final size of 14mm diameter and 7mm thickness.

The thus prepared samples (Nos. 1–16) of dielectric ceramic body in the form of discs were tested to measure the dielectric constant and the non-load Q value, according to Hakki & Coleman method. Also, the temperature coefficients (τf) of the resonance frequency of the samples over a range of −25° C. to 75° C. were measured. The measured values are indicated in TABLE 3. The measurements were made over the frequency range of 2–5 GHz. The Q values indicated in the tables are converted equivalents at 3 GHz.

It will be understood from TABLE 3 that the dielectric ceramic bodies made of the compositions Nos. 2–5 which contained alumina in respective amounts had relatively high Q values and relatively low temperature coefficients (τf) of the resonance frequency, as compared with that of the composition No. 1 which contained no alumina. However, it will be also understood that the dielectric ceramic body made of the composition No. 6 which contained 2.5 parts by weight of alumina had a considerably lowered Q value. The advantageous effects given by the presence of alumina will be also recognized by comparing the properties of the composition No. 7 and those of the compositions Nos. 8 and 9. Especially, the dielectric ceramic body made of the composition No. 9 had the temperature coefficient (τ) of 0, and is thus deemed remarkably excellent.

The advantageous effects due to the addition of alumina will also be readily recognized by comparing the composition No. 10 and the compositions Nos. 11–13, and by comparing the compositions 14–16 with one another. That is, the dielectric ceramic bodies made of the compositions containing not larger than 2.0 parts by weight of alumina according to the present invention had sufficiently high Q values and sufficiently lowered temperature coefficients, while maintaining relatively high dielectric constants.

TABLE 3

| No | x | y | z | a | b | Al2O3* | Dielectric Constant | Q | τf (ppm/°C.) |
|---|---|---|---|---|---|---|---|---|---|
| 1 | 0.140 | 0.675 | 0.185 | 0.10 | 0.10 | 0 | 84 | 2130 | −6 |
| 2 | 0.140 | 0.675 | 0.185 | 0.10 | 0.10 | 0.5 | 82 | 2480 | −8 |
| 3 | 0.140 | 0.675 | 0.185 | 0.10 | 0.10 | 1.0 | 79 | 2550 | −9 |
| 4 | 0.140 | 0.675 | 0.185 | 0.10 | 0.10 | 1.5 | 73 | 2670 | −11 |
| 5 | 0.140 | 0.675 | 0.185 | 0.10 | 0.10 | 2.0 | 70 | 2240 | −13 |
| 6 | 0.140 | 0.675 | 0.185 | 0.10 | 0.10 | 2.5 | 66 | 950 | −16 |
| 7 | 0.145 | 0.680 | 0.175 | 0.10 | 0.10 | 0 | 90 | 2190 | 13 |
| 8 | 0.145 | 0.680 | 0.175 | 0.10 | 0.10 | 0.5 | 88 | 2310 | 4 |
| 9 | 0.145 | 0.680 | 0.175 | 0.10 | 0.10 | 1.0 | 86 | 2500 | 0 |
| 10 | 0.150 | 0.675 | 0.175 | 0.20 | 0.25 | 0 | 104 | 1050 | 8 |
| 11 | 0.150 | 0.675 | 0.175 | 0.20 | 0.25 | 0.5 | 98 | 1120 | 2 |
| 12 | 0.150 | 0.675 | 0.175 | 0.20 | 0.25 | 1.0 | 95 | 1170 | −2 |
| 13 | 0.150 | 0.675 | 0.175 | 0.20 | 0.25 | 1.5 | 91 | 1180 | −6 |
| 14 | 0.167 | 0.667 | 0.166 | 0.15 | 0.20 | 0.5 | 96 | 1450 | 6 |
| 15 | 0.167 | 0.667 | 0.166 | 0.15 | 0.20 | 1.0 | 92 | 1490 | −1 |
| 16 | 0.167 | 0.667 | 0.166 | 0.15 | 0.20 | 1.5 | 89 | 1510 | −4 |

*parts by weight

What is claimed is:

1. A dielectric ceramic composition consisting essentially of barium oxide, titanium oxide, neodymium oxide, samarium oxide and bismuth oxide, which are represented by xBaO—yTiO$_2$—z[(1—a—b)Nd$_2$O$_3$—aSm$_2$O$_3$—bBi$_2$O$_3$], where $0.10 \leq x \leq 0.20$, $0.60 \leq y \leq 0.75$, $0.10 \leq z \leq 0.24$, $x+y+z=1$, $0 < a \leq 0.25$ and $0 < b \leq 0.30$.

2. The composition of claim 1, wherein a content of said samarium oxide is at least 3 mole %.

3. The composition of claim 1, wherein a content of said bismuth oxide is at least 5 mole %.

4. A dielectric ceramic composition consisting essentially of: barium oxide, titanium oxide, neodymium oxide, samarium oxide and bismuth oxide as major components which are represented by xBaO —yTiO$_2$—z[(1—1—b)Nd$_2$O$_3$—aSm$_2$O$_3$—bBi$_2$O$_3$], where $0.10 \leq x \leq 0.20$, $0.60 \leq y \leq 0.75$, $0.10 \leq z \leq 0.25$, $x+y+z=1$, $0 < a \leq 0.30$ and $0 < b \leq 0.35$; and further containing up to 2.0 parts by weight of alumina per 100 parts by weight of a total amount of said major components.

5. The composition of claim 4, wherein said major components comprise at least 3 mole % of said samarium oxide.

6. The composition of claim 4, wherein said major components comprise at least 5 mole % of said bismuth oxide.

7. The composition of claim 4, wherein an amount of said alumina is within a range of 0.1-1.8 parts by weight per 100 parts by weight of the total amount of said major components.

8. A sintered body having a dielectric composition consisting essentially of barium oxide, titanium oxide, neodymium oxide, samarium oxide and bismuth oxide as major components which are represented by $xBaO—yTiO_2—z,[(1-a-b)Nd_2O_3{-}_aSm_2O_3—bBi_2O_3]$, where $0.10 \leq x \leq 0.20$, $0.60 \leq y \leq 0.75$, $.10 \leq z \leq 0.24$, $x+y+z=1$, $0 < a \leq 0.25$ and $0 < b \leq 0.30$.

9. The sintered body of claim 8, wherein a content of samarium oxide is at least 3 mole %.

10. The sintered body of claim 8, wherein a content of siad bismuth oxide is at least 5 mole %.

11. The sintered body of claim 8, further comprising not more than 2.0 parts by weight of alumina per 100 parts by weight of a total amount of said major components.

12. The sintered body of claim 11, wherein an amount of said alumina is within a range of 0.1-1.8 parts by weight per 100 parts by weight of the total amount of said major components.

13. The sintered body of claim 8, having a dielectric constant between 69 and 106, a Q-value between 1,000 and 3,510 and a temperature coefficient, $\tau f$, between $-6$ and 48 ppm/°C., said dielectric constant, Q-value and temperature coefficient being evaluated within a frequency range of 3 to 4 GHZ.

* * * * *